(12) United States Patent
Kögel et al.

(10) Patent No.: US 12,115,482 B2
(45) Date of Patent: Oct. 15, 2024

(54) AIR TREATMENT SYSTEM, AND RELATED VEHICLES AND METHODS

(71) Applicant: AGCO International GmbH, Neuhausen (CH)

(72) Inventors: Fabian Kögel, Marktoberdorf (DE); Alexander Zeller, Fussen (DE)

(73) Assignee: AGCO International GmbH, Neuhausen (CH)

( * ) Notice: Subject to any disclaimer, the term of this patent is extended or adjusted under 35 U.S.C. 154(b) by 531 days.

(21) Appl. No.: 17/453,459

(22) Filed: Nov. 3, 2021

(65) Prior Publication Data

US 2022/0176289 A1   Jun. 9, 2022

(30) Foreign Application Priority Data

Dec. 3, 2020 (GB) ..................................... 2019049

(51) Int. Cl.
  *B01D 46/00* (2022.01)
  *B01D 46/24* (2006.01)
  *B60H 3/06* (2006.01)

(52) U.S. Cl.
  CPC ...... *B01D 46/0005* (2013.01); *B01D 46/2411* (2013.01); *B60H 3/0616* (2013.01); *B01D 2271/027* (2013.01); *B01D 2279/50* (2013.01); *B60H 2003/065* (2013.01)

(58) Field of Classification Search
  CPC ............ B01D 46/2411; B01D 46/2414; B01D 46/0005; B01D 2271/027; B01D 2279/50; B60H 3/0616; B60H 2003/065
  See application file for complete search history.

(56) References Cited

U.S. PATENT DOCUMENTS

2002/0152732 A1\*  10/2002  Kallsen .............. B01D 46/2414
                                                       55/482
2014/0260144 A1    9/2014  Williams et al.
2019/0193016 A1    6/2019  Woitoll et al.
                           (Continued)

FOREIGN PATENT DOCUMENTS

EP           2532542 A1    12/2012

OTHER PUBLICATIONS

UK Intellectual Property Office, Search Report prepared for claims 1-12 and 15-18 of priority Application No. GB2019049.2, dated May 21, 2021.

(Continued)

*Primary Examiner* — Robert Clemente (57) ABSTRACT

An air treatment system for an agricultural vehicle includes an air filtration apparatus having an air filter housing for receiving an air filter cartridge and downstream air processing apparatus fluidly connected with the air filter housing by a duct. The system can receive first and second type air filter cartridges having corresponding first and second outlet sealing configurations. The duct has inner and outer conduits that define an inner flow path and an outer flow path. A filter sealing arrangement of the duct can engage with either type of filter cartridge. This enables two different types of filter cartridge, which may be configured to provide different levels of filtration, to be selectively mounted to the system in the same housing. Air flow may be restricted to the inner flow path when one type of air filter cartridge is fitted.

20 Claims, 8 Drawing Sheets

(56) References Cited

U.S. PATENT DOCUMENTS

2019/0344206 A1  11/2019  Stark et al.
2020/0032905 A1  1/2020   Sieh et al.

OTHER PUBLICATIONS

UK Intellectual Property Office, Search Report prepared for claims 13, 14, and 18 of priority Application No. GB2019049.2, dated Aug. 10, 2021.

* cited by examiner

AIR TREATMENT SYSTEM, AND RELATED VEHICLES AND METHODS

CROSS-REFERENCE TO RELATED APPLICATIONS

This application claims the benefit of the filing date of U.K. Patent Application 2019049.2, "Air Treatment System," filed Dec. 3, 2020, the entire disclosure of which is incorporated herein by reference.

FIELD

Embodiments of the present disclosure relate generally to an air treatment system including air filtration apparatus upstream of air processing apparatus and in particular to an air treatment system for an operator environment or cab of an agricultural vehicle or a similar vehicle. Embodiments of the present disclosure also relate to an air filtration apparatus for use in such an air treatment system.

BACKGROUND

Agricultural vehicles are known to operate in environments in which many different kinds of particulates or other contaminants are present. This creates a requirement for filtration of the air for operators of such vehicles when in use. The particulates may be of different sizes and of different natures, for example larger particulates such as dust, pollen, and the like, and smaller contaminants such as fumes, aerosols, and vapors.

Legislation in various countries now requires the use of filters of a particular rating to filter out particular contaminants from the air, which contaminants would otherwise be introduced into the operator environment (e.g., an operator cab) of the agricultural vehicle. For example, in the European Union, EU Standard EN 15695 provides for four categories of filter for cabin protection, where Category 2 (CAT2) protects only against dust but does not protect against aerosols and vapors, Category 3 (CAT3) protects against dust and aerosol, but not vapors, and Category 4 (CAT4) protects against dust, aerosols, and vapors. In this context, CAT3 filters tend to be more expensive than CAT2 filters, and CAT4 are typically even most expensive.

It is known to provide an air filtration system that incorporates two or more separate filter cartridges of different grades to provide selective filtering of the air supply to a vehicle operator environment. The air system will typically include a valve arrangement to enable air to be drawn through a first filter cartridge when the predominant contaminant in the working environment of the agricultural vehicle is relatively large (for example when traversing a field) and through a second filter cartridge when the predominant contaminant in the working environment is relatively small (for example when applying an herbicide, pesticide or similar). This arrangement requires installation space for the separate filter cartridges. In addition, means must be provided to switch between operating modes for the different filtration levels. This also adds to the cost of the vehicle.

BRIEF SUMMARY

Embodiments of the disclosure relate to an air treatment system, air filtration apparatus and a vehicle.

In some embodiments, an air treatment system for an agricultural vehicle includes an air filtration apparatus having an air filter housing for receiving an air filter cartridge and downstream air processing apparatus fluidly connected with the air filter housing by a duct. The system includes first and second type air filter cartridges having respective first and second outlet sealing configurations. The duct has at least at an inlet end, inner and outer conduits that define an inner flow path within the inner conduit and an outer flow path between the inner and outer conduits and a filter cartridge sealing arrangement adapted for sealing engagement with either of the first and second type of filter cartridges. The arrangement may be configured such that air flow from the filter cartridge is restricted to the inner flow path when a second type air filter cartridge is fitted.

In another embodiment, an air treatment system includes an air filtration apparatus having an air filter housing for receiving an air filter cartridge and an air processing apparatus downstream of the air filter housing. The air processing apparatus is fluidly connected with the air filter housing by a duct, the duct having at its inlet end a filter cartridge sealing arrangement for sealing engagement with a corresponding outlet sealing arrangement of an air filter cartridge mounted in the air filter housing. A first type air filter cartridge has an outlet with an outlet sealing arrangement having a first configuration. A second type air filter cartridge has an outlet with an outlet sealing arrangement having a second configuration different from the first. The duct has, over at least part of its length proximal an inlet end, inner and outer conduits that define an inner flow path within the inner conduit and an outer flow path between the inner and outer conduits. The filter sealing arrangement of the duct is adapted for sealing engagement with an air filter cartridge outlet sealing arrangement according to either of the first and second configurations.

In an air filtration system according to this embodiment, filter cartridges of either of two different types offering different levels of filtration can be selectively inserted into the air filter housing in sealing engagement with an air duct of the system. The air filtration system is able to provide different levels of filtration with only one filter housing having room for only one filter cartridge at a time. This reduces the space required by the air filtration system, yet still enables the system to meet requirements for suitable air filtration cost effectively. The requirement for a valve arrangement in conventional systems to selectively direct air though one of two or more filter cartridges is also avoided.

The system may be configured such that when a first type air filter cartridge is mounted in the air filter housing, air is directed from the air filter cartridge outlet into both of the inner and outer flow paths and that when a second type air filter cartridge is mounted in the air filter housing, air is directed from the air filter cartridge outlet into one of the inner and outer flow paths only.

In some embodiments, the system is configured such that when a second type air filter cartridge is mounted in the air filter housing, an inlet to the other of flow path is blocked by the second type filter cartridge.

In some embodiments, the system is configured such that when a second type air filter cartridge is mounted in the air filter housing, air is directed from the second air filter cartridge outlet into the inner flow path only.

The duct filter sealing arrangement may include an outer cylindrical tubular sealing formation and an inner cylindrical tubular sealing formation arranged concentrically within the outer sealing formation, with the interior of the inner sealing formation defining an inlet to the inner flow path, and the inner and outer sealing formations defining an inlet to the outer flow path. The first type air filter cartridge may have a single sealing ring surrounding an outlet for filtered air, the sealing ring configured to engage the outer sealing formation on the duct, and the outlet configured to direct air into both the inner and outer flow paths in use. The second type air filter cartridge may have a sealing ring surrounding an outlet for filtered air, the sealing ring configured to engage the inner sealing formation on the duct, and the outlet configured to direct air into the inner flow path only. The second type air filter cartridge may also have a further sealing ring arranged concentrically about the first sealing ring, the further sealing ring configured to engage the outer sealing formation on the duct. In this case, the sealing rings may be provided on an end cap of the second type air filter cartridge made from a material impervious to air, which end cap extends radially between the sealing rings to close the outer flow path in use.

In some embodiments, each of the he first and second type air filter cartridges include a filter medium arranged in a cylindrical tube about a central bore having an axis and first and second end caps made of a material impervious to air. The first end cap may have a solid disc mounted at one axial end of the filter medium enclosing the one end, and the second end cap may be annular and mounted at the other axial end of filter medium, with a central orifice aligned with the central bore and defining the outlet from the filter cartridge. The central bore in the filter medium of the second type filter cartridge may be smaller in diameter than that of the first type filter cartridge. The outlet orifice in the second type filter may have a diameter no larger than that of the central bore.

In some embodiments, an air mass sensor is provided in the inner flow path.

The first type filter may be suitable for filtering dust but not aerosols or vapors, and may be a CAT2 or equivalent filter.

The second type filter may be suitable for filtering dust, aerosols, and vapors, and may be a CAT4 or equivalent filter.

In some embodiments, an air filtration apparatus for use in an air filtration system includes an air filter housing for receiving an air filter cartridge, and an air processing apparatus downstream of the air filter housing. The air processing apparatus is fluidly connected with the air filter housing by a duct having over at least part of its length proximal an inlet end, inner and outer conduits that define an inner flow path within the inner conduit and an outer flow path between the inner and outer conduits. A first filter sealing formation is associated with the outer conduit and a second filter sealing formation is associated with the inner conduit.

In some embodiments, the first filter sealing formation has a first cylindrical tubular member extending into the filter housing and encircling an inlet to the outer flow path, an outer circumferential surface of the first cylindrical tubular member defining a first duct sealing surface. The second filter sealing formation may have a second cylindrical tubular member extending into the filter housing and encircling an inlet to the inner flow path, with an outer circumferential surface of the second cylindrical tubular member defining a further duct sealing surface. The first tubular member may define an inlet end region of the outer conduit and the second tubular inlet member may define an inlet end region of the inner conduit.

A vehicle or mobile machine, especially an agricultural vehicle or mobile machine such as a tractor, harvester, sprayer or the like, may include an air treatment system or an air filtration apparatus as set forth above.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Embodiments of the disclosure will now be described in the following detailed description with reference to the drawings, wherein the embodiments are described to enable practice of the disclosure. Although the disclosure is exemplified with reference to these specific embodiments, it will be understood that the disclosure is not limited to or by these embodiments. But to the contrary, the disclosure includes numerous alternatives, modifications, and equivalents as will become apparent from consideration of the following detailed description.

Figure 1:
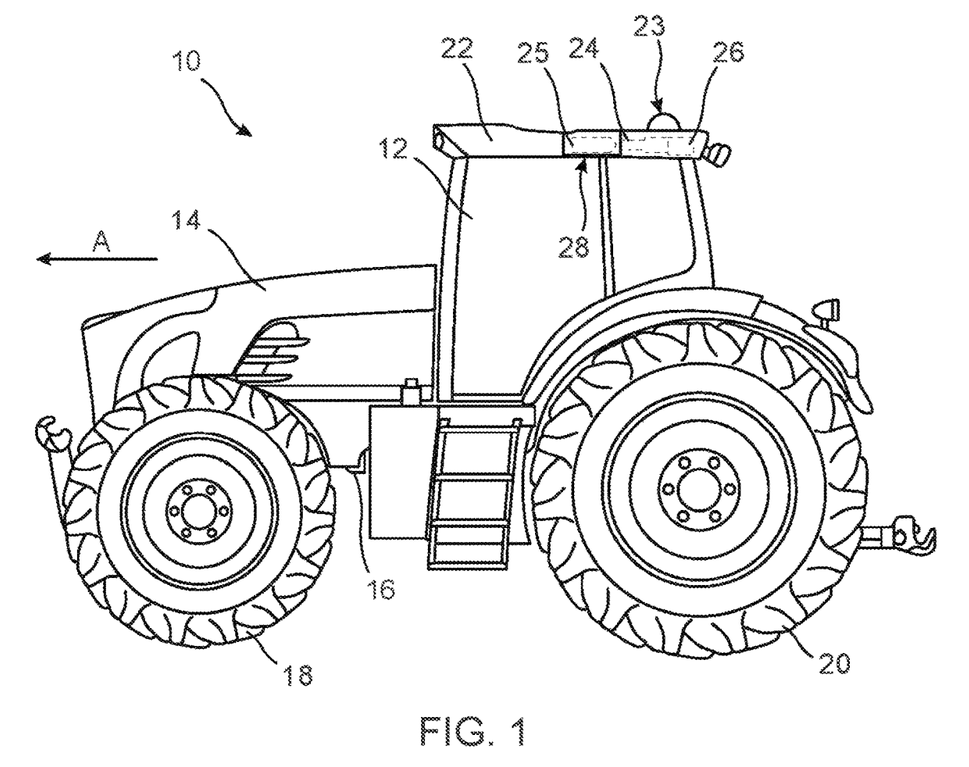
FIG. 1 shows a utility vehicle in the form of an agricultural tractor including an embodiment of an air treatment system according to the disclosure.

FIG. 1 illustrates an agricultural/utility vehicle or mobile machine in the form of a tractor 10 having an enclosed operator environment in the form of a cab 12 and an engine compartment 14. A chassis 16, which is partly visible, connects front wheel suspension and steering assembly 18 and rear axle assembly 20.

Figure 3:
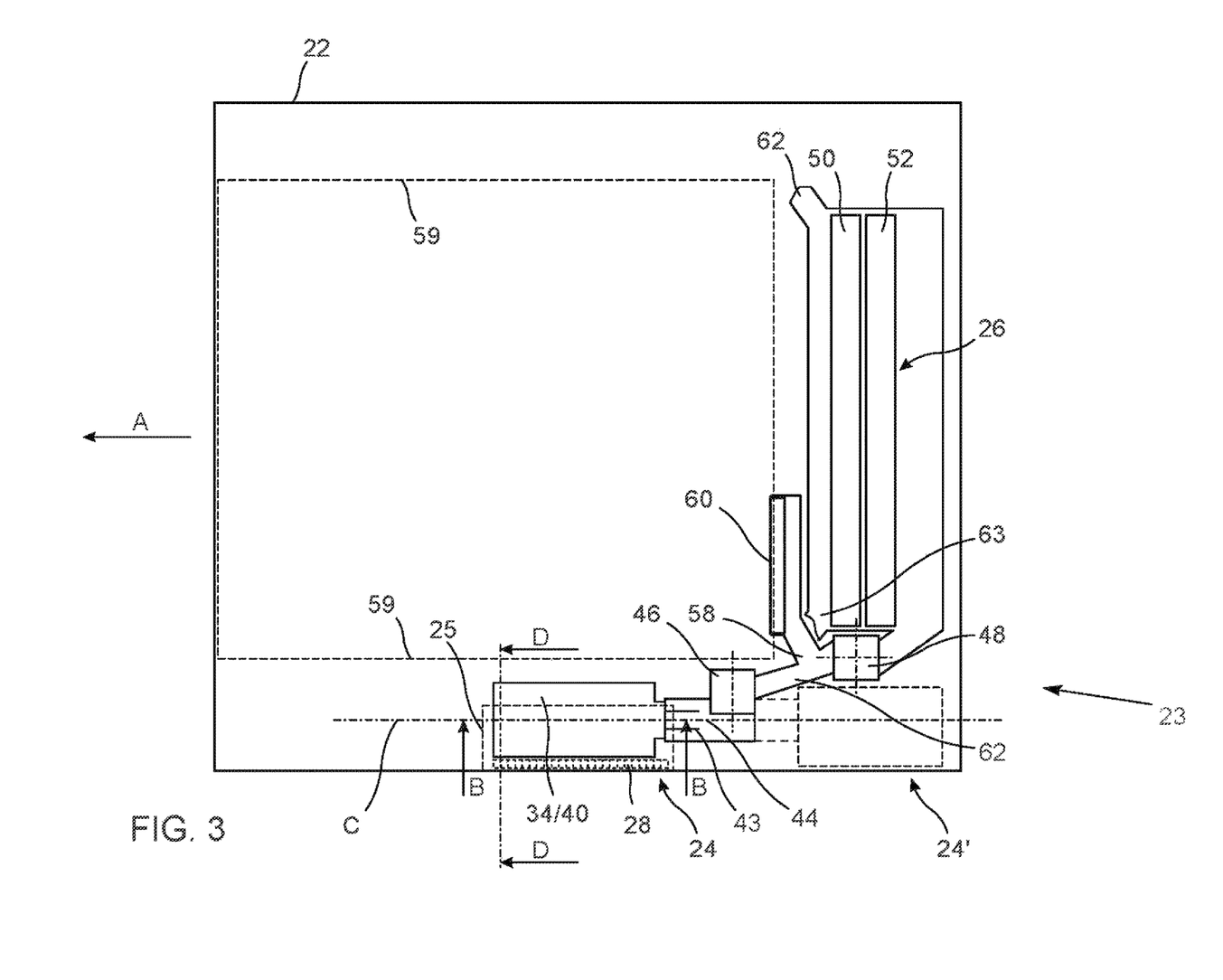
FIG. 3 illustrates, somewhat schematically, a layout of components of the air treatment system of FIG. 2 installed in the roof of the tractor of FIG. 1.
Figure 4:
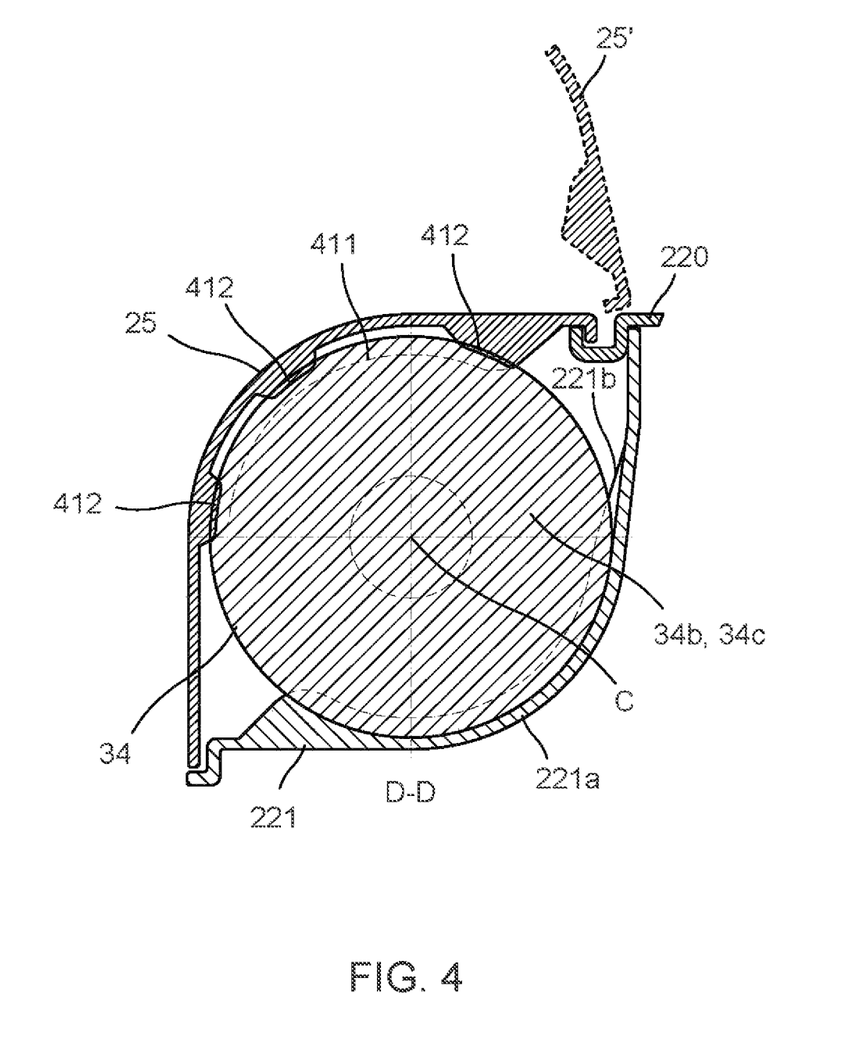
FIG. 4 is a sectional view through an air filter housing and air filter cartridge forming part of the air treatment system of FIG. 3, taken on line D-D.
Figure 5:
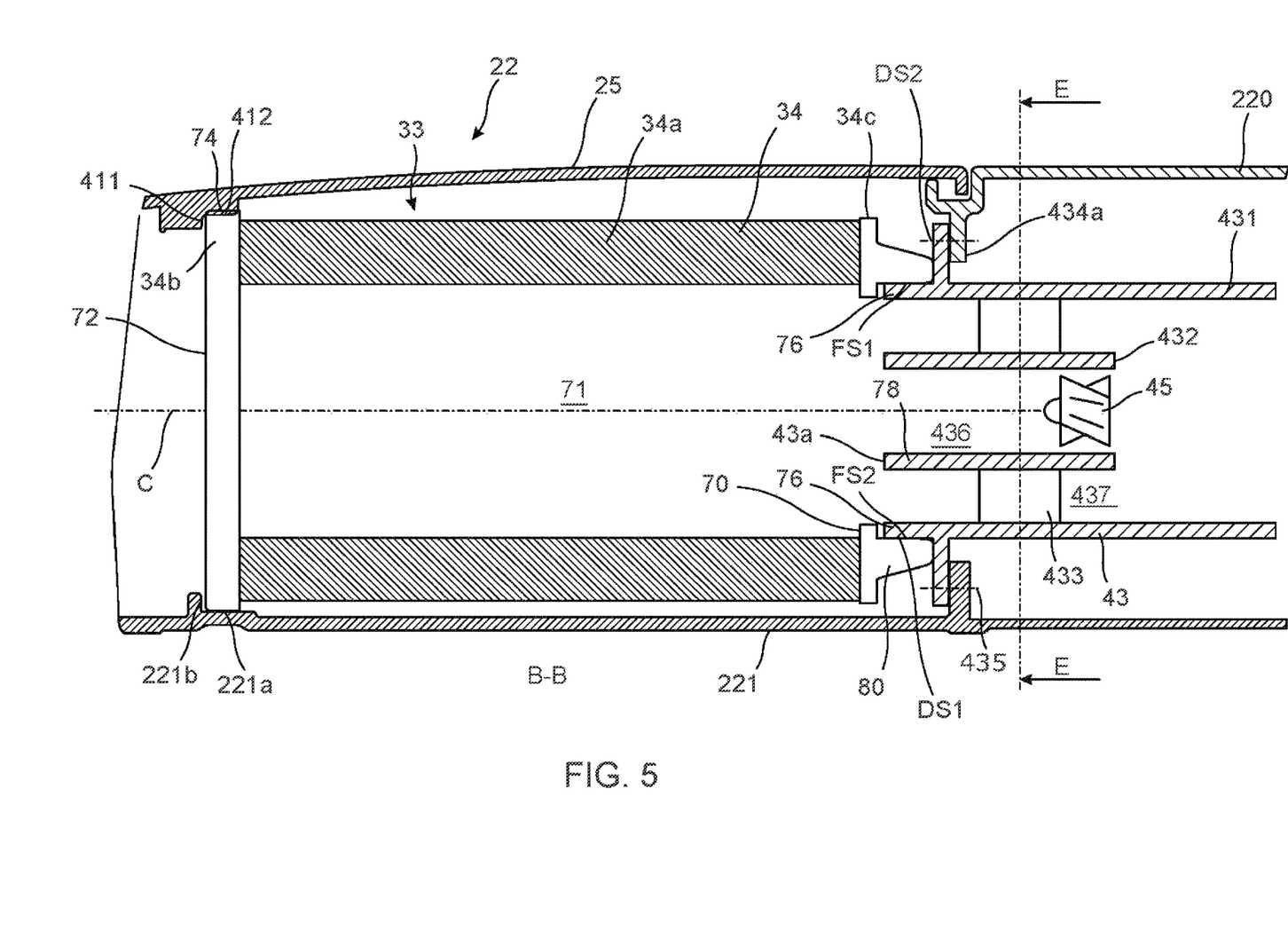
FIG. 5 is a sectional view through part of the air treatment system of FIG. 3 taken on line B-B with a first type air filter cartridge operatively assembled into the air filter housing.

With reference also to FIGS. 3 through 5, the cab 12 has a roof assembly 22 within which is mounted an air treatment system 23, which includes an air filtration system 24 and an HVAC (heating, ventilation, and air conditioning) system 26. An air inlet 28 for the air treatment system is located under an eaves overhang on a side of the roof assembly 22. The roof assembly 22 comprises upper roof part 220 and lower roof part 221 which together form a cavity for installation of major parts of the HVAC system 26 and parts of the air filtration system 24. An openable cover 25 in a side wall of the roof assembly 22 enables user access for inspection and/or replacement of filtration cartridges 34/40, which form part of the air filter system, as described further below.

Figure 2:
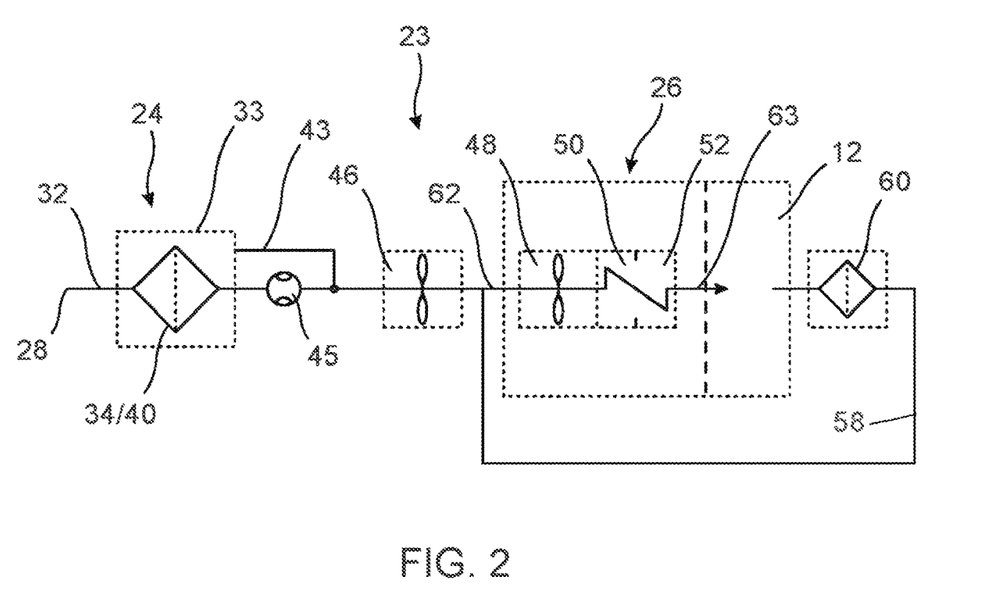
FIG. 2 is a schematic, functional representation of an embodiment of an air treatment system according to the disclosure suitable for use in the vehicle in FIG. 1.

The overall functional arrangement of the air treatment system 23 is illustrated schematically in FIG. 2, with the air filtration system 24 (to the left of the figure) connected to the HVAC system 26 (to the right of the figure) for the operator environment or cab 12 of the agricultural vehicle 10.

External air is drawn into the air treatment system 23 through an external air inlet 28, which may be in the form of a vent and/or duct 32, into an air filter housing 33 and through an air filter cartridge 34/40 located in the housing. From the air filter cartridge 34/40, the air passes through a filter duct 43 that directs the air to an inlet plenum of a first fan or air impeller device, referred to as pressurization blower 46. The output of this first blower 46 is connected by way of a further duct 62 to the input of a second fan or air impeller device, main blower 48, of the HVAC system 26. As will be described in more detail below, the filter duct 43 has two flow paths, one of which includes an air flow sensor 45. The HVAC system 26 typically includes additional components downstream of the main blower 48, such as, by way of example, an evaporator 50 and a heater 52. The treated air flow output from the HVAC system is directed to the interior of cab 12 by way of a cabin air supply duct 63.

An air recirculation path 58 is provided by a conduit extending between the interior of the cab 12 and the inlet to the main blower 48. The air recirculation path 58 may include a dust filter 60 (e.g., in the form of a simple cartridge filter easily replaceable by a user) to prevent dust from the ambient air within the cab 12 from being passed to the main blower 48 and downstream components 50, 52 of the HVAC system 26 and thereby reintroduced to the cab 12.

The air filter housing 33 holds only one filter cartridge 34/40 at any given time. However, the system includes interchangeable filter cartridges 34/40 having different filter grades which can be easily and quickly changed to meet different filtering requirements depending on the working conditions. The system includes interchangeable filter cartridges 34/40 of at least two different types, a first type filter cartridge 34 and a second type filter cartridge 40, each type of filter cartridge offering a different level of filtration. Typically, the first type filter cartridge 34 will have a filter element suitable for filtering dust and may be a CAT2 filtration device and the second type filter cartridge 40 will have a finer grade filter element capable of filtering dust, aerosols, and vapors and may be a CAT4 filtration device. It is expected that during normal operating conditions a first type filter cartridge 34 for protecting against dust will be assembled in the air filter housing 33. When there is a requirement for filtering to a different standard, say for filtering aerosols and/or vapors (for example when applying an herbicide, pesticide or similar), the first type filter cartridge 34 is removed and replaced by a second type filter cartridge 40. Once the requirement for a higher level of filtration has passed, the second type filter cartridge 40 is removed and replaced by a first type filter cartridge 34. This arrangement enables the air filtration system 24 to provide differing levels of filtration as required by changing working conditions, and only requiring space to fit one air filter cartridge 34/40.

FIG. 3 is a schematic plan, looking down from above, of an embodiment of the layout of the system components within the roof 22. The front of the tractor 10, and the usual direction of travel, is indicated by the arrow A. Arrow A is also coincident with a longitudinal axis of the tractor 10.

The filter cartridge 34/40 is mounted within the air filter housing 33 to one side of the roof. In this embodiment, the filter cartridges 34/40 are cylindrical, with the filter medium arranged in a circumferential orientation around an axis indicated by line C. When a filter cartridge 34/40 is installed in the filter housing 33, its axis C is aligned longitudinally in driving direction A. Inlet 28 to the filter housing 33 is positioned below the filter in an underside of the roof assembly 22, forming an eaves projection outside of the cab 12. The inlet 28 is represented schematically in FIG. 3 alongside the filter cartridge 34/40 to illustrate its position relative to the cartridge in a longitudinal direction of the tractor 10. In alternative embodiments, the inlet 28 can be located elsewhere so long as a suitable air flow through the filter is enabled.

Openable cover 25 in the roof assembly 22 enables user access to the interior of the filter housing 33 for inspection, maintenance, and/or replacement of the filter cartridge 34/40, as described in more detail below.

The filter duct 43 provides a fluid path for directing air from an outlet of the air filter cartridge 34/40 to the inlet plenum of the pressurization blower 46, and a further air duct 62 fluidly connects an outlet of the pressurization blower 46 to an inlet of the main blower 48 of the HVAC system 26. From the main blower 48, the flittered air is passed through additional components in the HVAC system 26. Details of the HVAC system 26 are well known in the art and are not described in detail herein. However, the additional components may include an evaporator 52 and heater 50 that extend internally across the rear of the roof assembly 22 adjacent a rear wall of the cab 12. The treated air flow output from the HVAC system 26 is directed to the interior of cab 12 by way of a cabin air supply duct 63. An opening from the cab 12 interior into the duct 62 provides the recirculation path 58 as mentioned above.

One benefit of the layout of the air treatment system 23 as illustrated in FIG. 3 is that the inlet 28 for the air filtration system is located under an eaves overhang at the side of the roof, which tends to be a less dusty environment than the front or rear. This helps to reduce the volume of airborne material drawn into the filter. Secondly, the position of the air filter cartridge 34/40 along one side of the cab 12 provides for easy access for the operator. A third benefit of having the filtration system and HVAC components mounted around the periphery of the cab roof 22 is that it enables a clearance area (indicated generally by dashed line 59), giving improved user headroom in the center of the cab 12.

Figure 6:
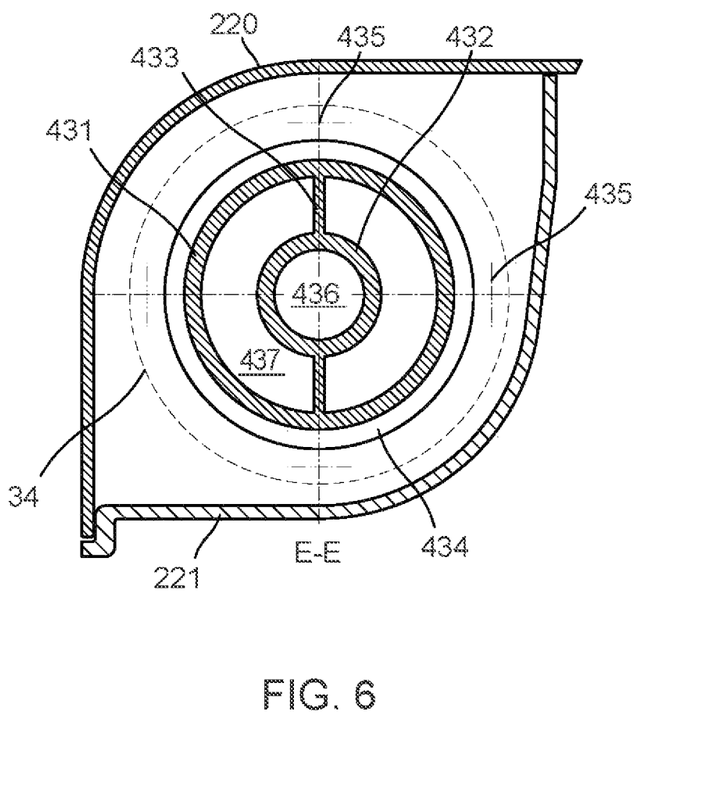
FIG. 6 is a sectional view through an air duct forming part of the air treatment system of FIGS. 2 to 5, taken on line E-E in FIG. 5.

FIGS. 4 through 6 illustrate the mounting of a first type of filter cartridge 34 in the filter housing 33 in an operative condition. The filter cartridge 34 is cylindrical with a filter medium 34a arranged in circumferential orientation around the axis C. In this first type of filter cartridge 34, the filter medium may be simple folded filter paper (suitable for CAT2). A disc-like end cap 34b, 34c is located at either end of the filter medium 34a. The end caps 34b, 34c may be made from flexible material such as rubber, foam, etc. One of the end caps 34b fully encloses one end of the filter medium 34a. The other end cap 34c is annular, having a central orifice 70 which defines an outlet of the filter cartridge. The annular filter medium 34a surrounds a central bore 71 aligned with the outlet 70. The end caps 34b, 34c are impervious to air so that the filter cartridge 34 defines a flow path which requires air to pass through the filter medium 34a into the central bore 71 and out through the outlet orifice 70.

The end caps 34b, 34c are used mount the filter cartridge 34 in the housing 33 between an upper roof part 220 and a lower roof part 221 of roof assembly 22. As mentioned previously, an openable cover 25 (with the open position indicated with 25' in FIG. 4) is provided in the roof assembly 22, mainly in the upper roof part 220 to enable access to the filter housing 33. The outer circumference of the first end cap 34b engages with formations in the lower roof part 221 and the openable cover 25 when the cover 25 is closed, to secure the filter cartridge in the housing. To this end, the cover 25 has a first abutment 411 that engages an axial end face 72 of the first end cap 34b to prevent movement of the filtration device 34 along its longitudinal axis C and a plurality of second formations 412 having arcuate contours that engage an outer circumferential face 74 of the first end cap 34b. The second formations 412 are spaced apart so as to engage the circumferential face 74 of the first end cap 34 at different locations and are configured to press the outer circumferential surface 74 of the first end cap 34b into engagement with a correspondingly arcuate support contour 221a in the lower roof part 221 when the cover 25 is closed. The arcuate surfaces of the second formations 412 are diametrically spaced from the arcuate support surface 221a by a distance that is less than the outer diameter of the first end cap 34b to increase pressure and balance tolerances.

The second end cap 34c forms a sealed engagement with the inlet end of the air filter duct 43 so that filtered air exiting the filter cartridge through the outlet orifice 70 is constrained to enter the filter duct 43. As shown in FIG. 5, and in more detail in FIG. 6, an inlet end of the filter duct 43 includes a filter connector portion 43a having an outer duct portion 431 and an inner duct portion 432 within the outer duct portion 431. In this embodiment, the inner air duct portion 432 and the outer duct portion 431 are cylindrical tubes and arranged concentrically, wherein the outer duct portion 431 at least partly surrounds inner duct portion 432. A first, inner air flow path 436 is defined through the inner duct portion 432 and a second, outer air flow path 437 is defined by the annular space between the inner and outer duct portions. The inner and outer duct portions are joined together by two radial webs 433. More than two spaced webs 433 may be provided to connect the inner and outer duct portions, provided that air flow through the second flow path 437 is not overly restricted. An air flow sensor 45 is mounted within the inner duct portion 432 to measure the flow of air through the first air flow path 437.

A mounting flange 434 projects radially outwardly about the outer circumference of the outer duct portion 431 close to an inlet end of the filter duct 43. The mounting flange 434 is configured to abut corresponding mounting flanges 434a which project radially inwardly from the inner surfaces of the upper roof part 220 and lower roof part 221c. The mounting flange 434 and the corresponding mounting flanges 434a have a number of corresponding and aligned axial through holes, indicated by the axes 435, through which fastenings are passed to mount the filter duct inlet connector portion 43a in position. It will be appreciated that other arrangements for mounting the connector portion 43a of filter duct 43 can be adopted.

The connector portion 43a may be configured to connect at an outlet end to the inlet plenum of the pressurization blower 46. Alternatively, the duct 43 may include a further duct for directing air from an outlet region of the connector portion to the blower 46.

The connector portion 43a may be manufactured from polymeric materials, such as by injection molding. Alternative manufacturing methods may also be used. Furthermore, the inner duct portion 432 and outer duct portion 431 may be produced separately and joined afterwards in any known manner, such as by adhesive or ultrasonic welding, for example.

As illustrated in FIG. 5, the second end cap 34c of the filter cartridge sealingly engages with the inlet end of the filter duct 43 so that filtered air that has passed through the filter medium 34a enters the filter duct 43. The inlet ends of the outer and inner duct portions 431, 432 extend beyond the plane of the mounting flange 434 into the filter housing 33 to define air filter cartridge sealing formations 76, 78, which are engaged by corresponding filter cartridge outlet formations 80, 82 to form a seal between a filter cartridge and the filter duct 43.

In respect of the first type filter cartridge 34 as shown in FIG. 5, the second end cap 34c has a single filter outlet formation 80 that engages with a first sealing formation 76 defined by the inlet end of the outer duct portion 431, where it projects into the filter housing beyond the mounting flange 434. The outer circumferential surface of the first sealing formation 76 defines first duct sealing surface DS1. The filter outlet formation 80 is in the form of an annular projection or sealing ring which extends axially outwardly from the outer axial end face of the second end cap 34c about the outlet orifice 70. A radially inwardly directed face of the filter outlet formation 80 defines a first filter sealing surface FS1, which engages with a tight fit over the first duct sealing surface DS1. An axial end face of the first filter outlet formation 80 defines a second filter sealing surface FS2 which, when the filter cartridge 34 is fully fitted, engages a second duct sealing surface DS2 defined by an opposing axial face of the mounting flange 434. Engagement of the second filter surface FS2 and the second duct sealing surface DS2 mainly serves to limit axial movement of the filter cartridge but also provides some sealing functionality.

Engagement of the filter outlet formation 80 with the inlet end (sealing formation) 76 of the outer duct portion 431 provides a sealed engagement between the filter cartridge 34 and the filter duct 43. When the 46 pressurization blower and/or 48 main blower are operated, external air is drawn into the filter housing 33, through the filter medium 34a to the central bore 71, through the outlet orifice 70 and into the filter duct 43. In this case, air is able to pass through both the inner and outer flow paths 436, 437 of the filter duct 43.

The first type filter cartridge 34 is inserted in the filtration system 24 by opening the cover 25, aligning the filter outlet formation 80 with the inlet end 76 of the outer duct portion 431 and pushing the filter cartridge 34 so that the filter outlet formation 80 slides over the inlet end 76 of the outer duct portion 431 until the axial end surface FS2 of the filter outlet formation 80 contacts the surface DS2 of the mounting flange 434. The flexibility of the material from which the end caps are made helps the filter outlet formation 80 align on and seal with the inlet end 76 of the outer duct portion 431. The cover 25 is then closed to secure the filter cartridge 34 in place. The cover 25 may include a latch to secure it in the closed position. The process is reversed to remove the first type filter cartridge 34.

Figure 7:
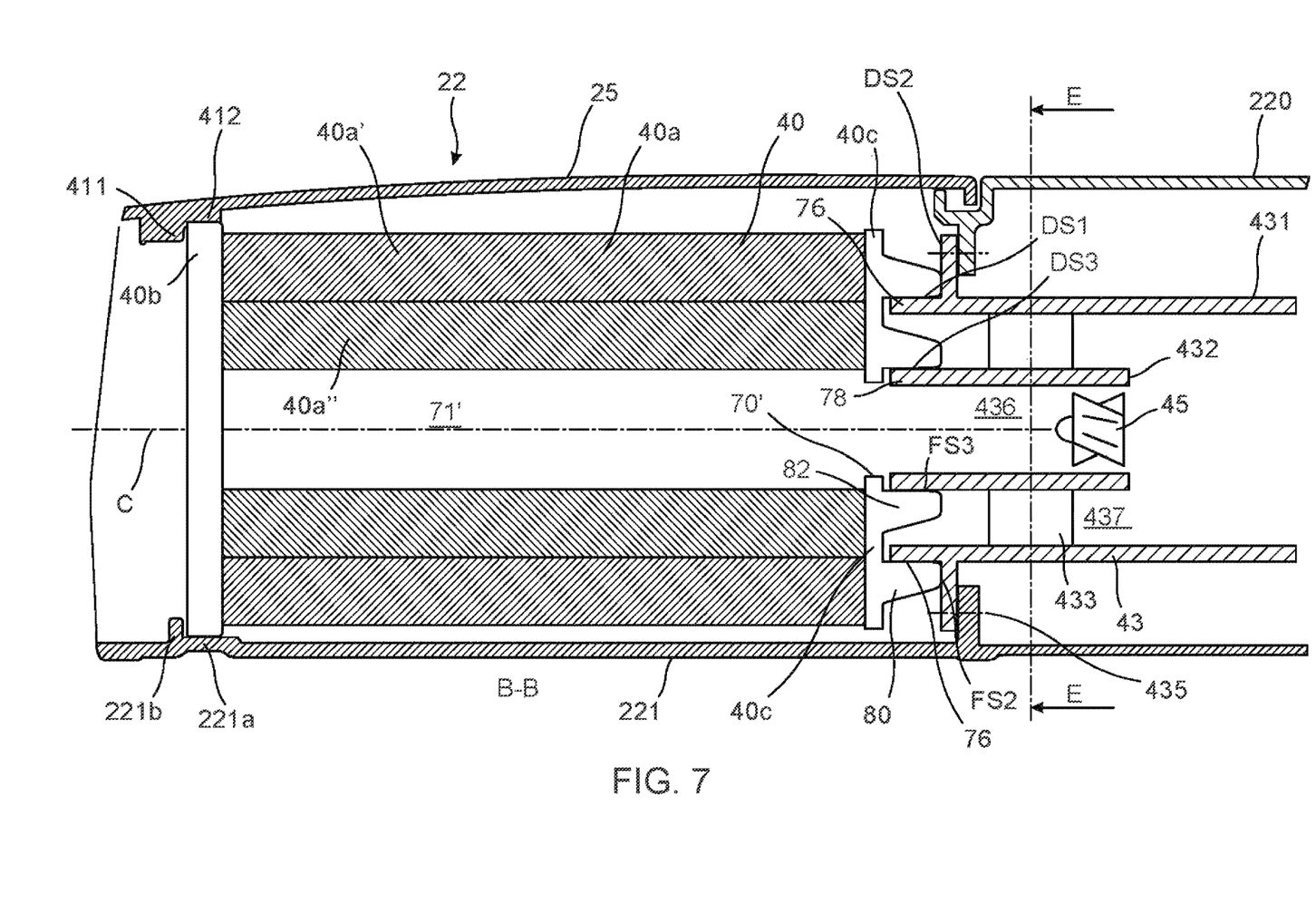
FIG. 7 is a view similar to that of FIG. 5 but showing a second type air filter cartridge operatively assembled into the air filter housing.

FIG. 7 illustrates mounting of a second type filter cartridge 40 in the filter housing 33. The second type filter cartridge 40 is constructed in a similar manner to the first type, having an annular, cylindrical arrangement of filter medium 40a mounted between a first end cap 40b and a second end cap 40c. The first end cap 40b is substantially the same as the first end cap 34b of the first type filter and co-operates with the mounting formations 411, 412, 221a, 221b of the openable cover 25 and the lower roof surface 221 in a similar manner. Accordingly, this will not be descried in detail, and the reader should refer to the description above regarding the first type filter cartridge 34 for detail. The main differences between the second type filter cartridge 40 and the first type of filter cartridge 34 lie in the filter medium 40a, the second end cap 40c, and the way the second end cap engages with the filter duct 43.

The filter medium 40a includes a first, outer layer of filter medium 40a', which may be simple folded filter paper (similar to CAT2), and a second, inner layer of filter medium 40a'' of activated carbon, which absorbs aerosols, vapor, or the like. The second layer of filter medium 40a" is arranged concentrically inside the first layer so that the second filter medium is downstream of the first filter medium 40a' in the direction of air flow. The second type filter cartridge 40 has the same outer dimensions, in terms of diameter and length, as the first type filter cartridge 34. Accordingly, The presence of the second, inner layer of filter medium 40a" means that the diameter of the central inner bore 71' is smaller than that of the first type filter cartridge 34. As a consequence, the outlet orifice 70' in the second end cap 40c is correspondingly smaller so that air passing through the second type filter cartridge 40 is constrained to pass through both layers of filter medium 40a', 40a", the central bore 71', and through the outlet orifice 70'.

The second end cap 40c has a first filter outlet engagement formation 80 that engages with the first filter outlet engagement formation 76 defined by the inlet end of the outer duct portion 342. The first filter engagement formation 80 and the way it engages with the outer duct portion 431 is essentially the same as that described above in relation to the first type filter cartridge 34 described above. Accordingly, this will not be described in detail.

In addition to the first filter outlet engagement formation 80, the second type filter cartridge 40 has a second filter outlet formation 82 or sealing ring arranged concentrically inside the first filter outlet engagement formation 80 surrounding the outlet orifice 70'. The second filter outlet formation 82 is similar to the first filter outlet engagement formation 80. The second filter outlet formation 82 has a radially inwardly directed face which defines a third filter sealing surface FS3 that engages with a tight fit over the outer circumferential sealing surface DS3 of the second, inner sealing formation 78 defined by the inlet end of the inner duct portion 432. A seal is formed between the second outlet formation 82 of the filter cartridge 40 and the inner sealing formation 78 of the filter duct 43.

When the second type filter cartridge is fitted into the air filtration system 24, the second, inner filter outlet formation 82 sealingly engages with the outer surface of the inlet end 78 of the inner duct portion 432 so that air drawn through the outlet orifice 70' is constrained to enter the inner flow path 436 only. Accordingly, all the air passing through the filter flows though the inner flow path 436 and the air flow sensor 45. The first filter outlet formation 80 also sealingly engages with the inlet end 76 of the outer duct portion so that air is not drawn into the outer flow path 437 past the filter cartridge. As illustrated in FIGS. 5 and 7, the inner duct portion 432 may only extend over part of the length of the duct 43 so that the two air flow passages 436 and 437 merge into one at the downstream end of the inner duct portion. In this embodiment, a seal between the second end cap 40c and the outer duct portion 431 prevents air being drawn in through the outer flow path 437. The outer filter outlet formation 80 and the region of the second end cap 40c between the outer and inner outlet formations 80, 82 serve to block the inlet to the outer flow path 437.

The profiles of the filter outlet formations 80, 82 and the sealing formations 76, 78 of the duct portions 131, 132 with which they engage may vary from those shown. In an alternative embodiment, the filter cartridge engagement formations 80, 82 may not engage directly with the outer and/or inner duct portions, but may engage other sealing formations associated with the duct portions. Any suitable sealing arrangement between the duct and the filter cartridges can be adopted provided that when a filter cartridge 34/40 is fitted, an effective seal is formed between the filter cartridge and the filter duct and that when a filter cartridge of the second type is fitted, air exiting the filter cartridge is directed through the inner flow path only.

The inlet region of filter duct 43 may be provided with demolding inclines, especially the first (circumferential) duct sealing surface DS1 or third (circumferential) duct sealing surface DS3 of air duct 43 may be slightly inclined. Furthermore, first (circumferential) filter sealing surface FS1 and third (circumferential) filter sealing surface FS3 of the filter cartridges 34, 40 may be slightly inclined to provide a biasing for the sealed engagement.

In the embodiment described above, the connection portion 43a of the filter duct 43 is adapted to direct air generally in an axial direction C of the filter cartridge. This is appropriate where the filter duct extends generally in-line with the axis C of the filter cartridge, at least over an initial length of the duct. However, in some installations there may not be room for the filter duct 43 to extend in the axial direction C and it may be necessary or desirable to turn the air flow leaving the filter cartridge through 90° or even 180° shortly after leaving the filter cartridge 34/40.

Figure 8A:
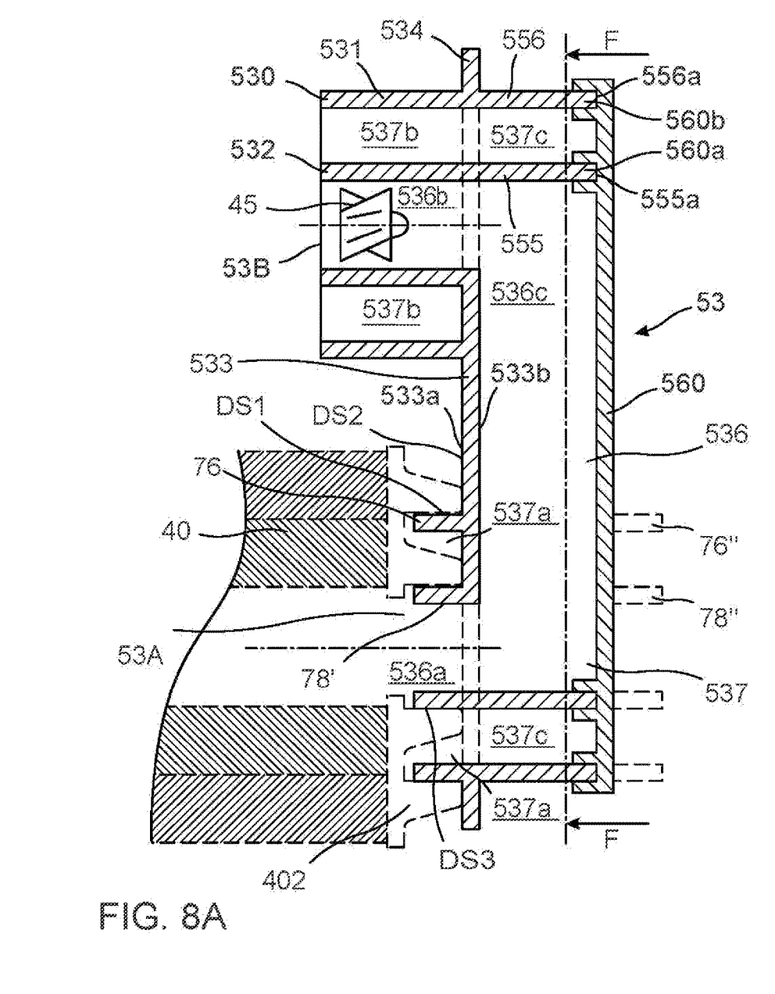
FIGS. 8a and 8b are cross-sectional views illustrating an alternative duct arrangement for use in an air treatment system in according to the disclosure.
Figure 8B:
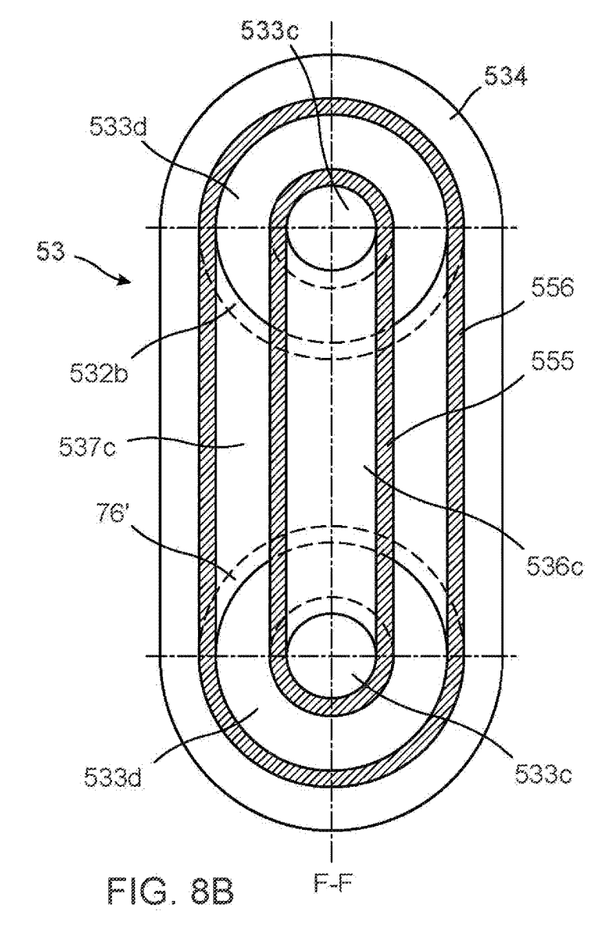

FIGS. 8A and 8B illustrate an alternative filter duct connection portion 53 suitable for installations in which the air flow from the filter cartridge is to be guided through a 180° turn. This solution could be used, for example, to locate the filter cartridge in the position indicated at 24' in FIG. 3. In this embodiment, the connection portion 53 of the filter duct 43 is constructed of two parts, a main body 530 and a cover 560. The parts 530, 560 are assembled together to define inner and outer flow paths 536, 537. The connection portion body 530 and cover 560 may be manufactured by injection molding, whereby the closing direction of the molding tool for each part parts 530,560 is along of axis C of the filter cartridge 34/40.

The connection portion 53 has an inlet end 53A and an outlet end 53B. The body 530 has a planar front wall 533, which in use extends parallel to the outer axial face of the second end cap of a filter cartridge 34/40 when mounted in the filter housing. At the inlet end 53A, the duct body 530 has a first, outer cylindrical tubular sealing formation 76' projecting from the outer surface of the front wall 533 into the filter housing, that is to say towards the second end cap of a filter cartridge in use. A second, inner cylindrical tubular sealing formation 78' projects from the outer surface of the wall 533 into the filter housing concentrically inside the first. The first and second sealing formations 76', 78' correspond to the inlet end regions or sealing formations 76, 78 of the outer and inner duct portions in the previous embodiment and are arranged to engage with sealing rings 80, 82 on the first and second type filter cartridges 34/40 in a similar manner. To this end, the outer circumferential surfaces of the first and second sealing formations 76', 78' define the first and third duct sealing surfaces DS1 and DS3, and the outer face 533a of the front wall 533 defines the second duct sealing surface DS2 in the region surrounding the first, outer sealing formation 76'. The first and second filter formations 76', 78' can be considered to comprise concentric parts of an outer duct portion and an inner duct portion respectively.

At the outlet end 53b of the connection portion 53, a first outer cylindrical tubular outlet formation 531 extends from outer surface 533a of the wall 533 generally parallel to the first and second sealing formations 76', 78'. A second, inner cylindrical tubular outlet formation 532 extends from outer surface 533a of the wall concentrically within the first 531.

The interior 536a of the inner sealing formation 78' defines an inlet portion 536a of an inner flow path 536 through the duct portion, and the interior of the inner outlet formation 532 defines an outlet portion 536b of the inner flow path 536. Similarly, the region between the outer and inner sealing formations 76', 78' defines an inlet portion 537a of an outer flow path 537 through the connection portion 53 of the duct, and the region between the outer and inner outlet formations 531, 532 defines an outlet portion 537b of the second flow path 537.

The inlet and outlet portions 536a, 536b, 537a, 537b of the flow paths are interconnected by separate intermediate inner and outer flow path portions 536c, 537c, which are defined between the inner surface 533b of the front wall 533 and the cover 560. Circular inner flow path orifices 533c extend through the front wall 533 centrally of the second sealing formation 78' and the second outlet formation 532 respectively. The intermediate portion 536c of the inner flow path is defined by a first partition wall 555 that extends between the front wall 533, and the cover 566 and is shaped generally as an elongate oval extending about the outer circumferential edges of and between the circular orifices 533c of the inner flow path. Arcuate outer flow path orifices 533d extend through the front wall 533 in the regions between the first and second sealing formations 76', 78' and the first and second outlet formations 531, 532 respectively. The outer flow path orifices 533d are generally toroidal in shape but are only present outside the area enclosed by the first partition wall 555. A second partition wall 556 extends between the inner surface 533b of the front wall and the cover 560. The second partition wall surrounds the first partition wall 555 and is shaped generally as an elongate oval so as to extend about the outer circumferential edges of and between the outer flow path orifices 533d. In the embodiment as shown, the partition walls 555, 556 are molded integrally with the main body 530 and the cover 560 defines a pair of channels 560a, 560b in which end regions 555a, 556a of the partition walls are received. The cover may be secured to the main body by adhesive or welding to ensure an air tight seal between them. However, other methods of fixing the cover and the main body can be adopted.

An air flow sensor 45 is mounted in the inner air flow path 536. As shown, this can be located within the second outlet formation 531b, though it could be positioned elsewhere.

Either of the first and second type air filter cartridges 34, 40 as previously described can be selectively mounted to the first and second inlet formations 76', 78' in a manner similar to that of the previous embodiment. Accordingly, this will not be described in detail and a filter cartridge 40 of the second type only is shown.

In a modification, a second filter cartridge could be mounted to the connection portion 53 outer and inner sealing formations extending outwardly from the outer face of the cover, as indicated in ghost at 76", 78", with suitable orifices being provided through the cover. This also indicates a possible alternative position for the inlet where only single filter cartridge is connected.

In order to mount the connection portion 53 in the vehicle roof, the front wall 533 projects radially outwardly beyond the second partition wall 556 to define a mounting flange 534. The mounting flange 534 may abut corresponding mounting flanges on the upper and lower parts of the roof in a similar manner to the first embodiment described above.

Figure 8C:
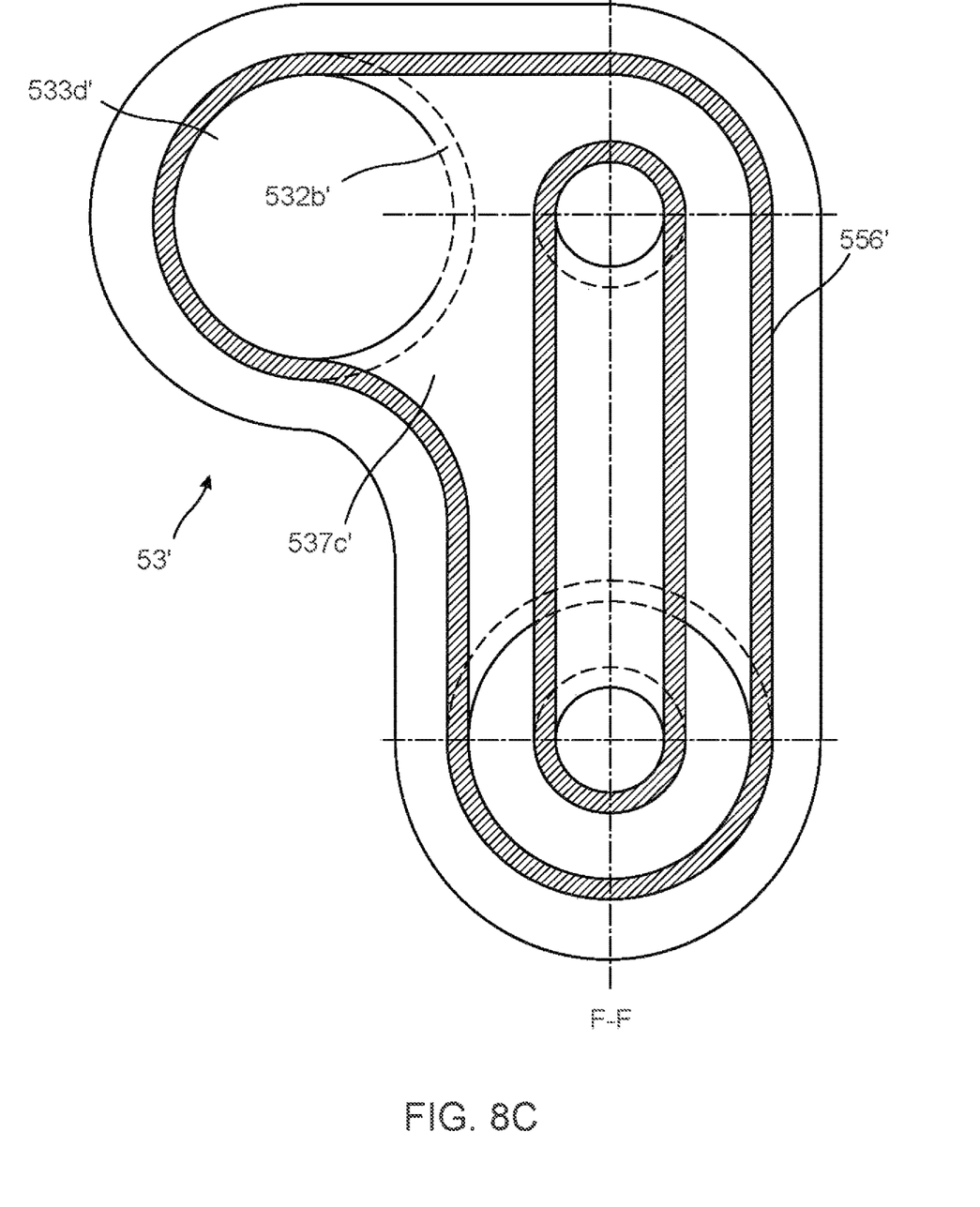
FIG. 8c is a view similar to that of FIG. 8b but illustrating a still further alterative duct arrangement.

In the embodiment described above, the outlet of the outer flow path 537 is arranged concentrically about the outlet for the inner flow path 536. FIG. 8C illustrates how the outlet for the second flow path 537 could be offset to one side of that for the inner flow path. In this embodiment, the connection portion 53' is essentially L-shaped and the intermediate portion 537c' of the outer flow path as defined by the second partition wall 556' is also L-shaped to encompass a circular outlet orifice 533d' for the outer flow path located to one side of the outlet orifice for the inner flow path. The shape of the duct 53 can be modified in various walls to accommodate different installation requirements.

When a second type CAT4 filter cartridge is fitted, the whole air flow from the filter cartridge may pass through the inner flow path 436, 536 and the sensor 45 can monitor the air flow according legal requirements in CAT4 operation. The outer flow path 437, 537 may be closed off by the filter cartridge 40 without the use of additional flaps in the ducting, which would require installation space and increase costs. In CAT2 operation, which may focus on maximum airflow, both air flow passages 436, 437 can enable high mass flow rate, and the sensor 45, which is not required in CAT2 operation, is partly bypassed. Even in the event that aerosols or vapors pass the second type of filter cartridge 40 during CAT4 operation, the outer flow path 437, 537 will not be contaminated and so will not require cleaning before subsequent use.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

For example, though embodiments of the disclosure have been described with reference to an agricultural tractor, embodiments of the disclosure are not limited to application to agricultural tractors but rather can be adapted for use with a wide range of other agricultural vehicles, such as harvesters, sprayers, and the like, as well as non-agricultural vehicles or mobile machines which are operated in environments that require different levels of filtration.

What is claimed is:

1. An air treatment system comprising:
    an air filtration apparatus having an air filter housing configured to alternatingly receive a first type air filter cartridge and a second type air filter cartridge, the first type air filter cartridge having an outlet with an outlet sealing arrangement having a first configuration, and the second type air filter cartridge having an outlet with an outlet sealing arrangement having a second configuration different from the first configuration;
    an air processing apparatus downstream of the air filter housing; and
    a duct fluidly connecting the air processing apparatus with the air filter housing, the duct having a filter cartridge sealing arrangement at an inlet end, the filter cartridge sealing arrangement configured for sealing engagement with a corresponding outlet sealing arrangement of an air filter cartridge mounted in the air filter housing, wherein the duct has inner and outer conduits over at least part of a length proximal the inlet end, wherein the inner conduit defines an inner flow path, and wherein the inner and outer conduits define an outer flow path between the inner and outer conduits;
    wherein the filter cartridge sealing arrangement of the duct is configured for sealing engagement alternatingly with both of the first and second configurations of the outlet sealing arrangements of the first and second type air filter cartridges.

2. The air treatment system of claim 1, wherein the system is configured such that when the first type air filter cartridge is mounted in the air filter housing, air is directed from the air filter cartridge outlet into both of the inner and outer flow paths and that when the second type air filter cartridge is mounted in the air filter housing, air is directed from the air filter cartridge outlet into one of the inner and outer flow paths only.

3. The air treatment system of claim 2, wherein the system is configured such that when the second type air filter cartridge is mounted in the air filter housing, an inlet to the other of the inner and outer flow paths is blocked by the second type filter cartridge.

4. The air treatment system of claim 2, wherein the system is configured such that when the second type air filter cartridge is mounted in the air filter housing, air is directed from the second air filter cartridge outlet into the inner flow path only.

5. The air treatment system of claim 1, wherein the duct filter sealing arrangement comprises an outer cylindrical tubular sealing formation and an inner cylindrical tubular sealing formation arranged concentrically within the outer sealing formation, the interior of the inner sealing formation defining an inlet to the inner flow path, an inlet to the outer flow path being defined between the inner and outer sealing formations.

6. The air treatment system of claim 5, wherein the first type air filter cartridge has a single sealing ring surrounding an outlet for filtered air, the sealing ring configured to engage the outer sealing formation on the duct, the outlet configured to direct air into both the inner and outer flow paths in use.

7. The air treatment system of claim 5, wherein the second type air filter cartridge has a first sealing ring surrounding an outlet for filtered air, the first sealing ring configured to engage the inner sealing formation on the duct, the outlet configured to direct air into the inner flow path only.

8. The air treatment system of claim 7, wherein the second type air filter cartridge comprises a second sealing ring arranged concentrically about the first sealing ring, the second sealing ring configured to engage the outer sealing formation on the duct.

9. The air treatment system of claim 8, wherein the first and second sealing rings are on an end cap of the second type air filter cartridge, wherein the end cap comprises a material impervious to air, wherein the end cap extends radially between the first and second sealing rings.

10. The air treatment system of claim 1, wherein each of the first and second type air filter cartridges comprises a filter medium arranged in a cylindrical tube about a central bore having an axis, and first and second end caps comprising a material impervious to air, a first end cap comprising a solid disc mounted at a first axial end of the filter medium and enclosing the first end, the second end cap being annular and mounted at a second axial end of the filter medium, the second end cap having a central orifice aligned with the central bore and defining the outlet from the filter cartridge.

11. The air treatment system of claim 10, wherein the central bore in the filter medium of the second type filter cartridge has a smaller diameter than the central bore of the first type filter cartridge, wherein the outlet orifice in the second type filter has a diameter which is no larger than the diameter of the central bore.

12. The air treatment system of claim 1, further comprising an air mass sensor in the inner flow path.

13. A vehicle comprising an air treatment system, the air treatment system comprising:
   an air filtration apparatus having an air filter housing configured to alternatingly receive a first type air filter cartridge and a second type air filter cartridge, the first type air filter cartridge having an outlet with an outlet sealing arrangement having a first configuration, and the second type air filter cartridge having an outlet with an outlet sealing arrangement having a second configuration different from the first configuration;
   air processing apparatus downstream of the air filter housing; and
   a duct fluidly connecting the air processing apparatus with the air filter housing, the duct having a filter cartridge sealing arrangement at an inlet end, the filter cartridge sealing arrangement configured for sealing engagement with a corresponding outlet sealing arrangement of an air filter cartridge mounted in the air filter housing, wherein the duct has inner and outer conduits over at least part of a length proximal the inlet end, wherein the inner conduit defines an inner flow path, and wherein the inner and outer conduits define an outer flow path between the inner and outer conduits;
   wherein the filter cartridge sealing arrangement of the duct is configured for sealing engagement alternatingly with both of the first and second configurations of the outlet sealing arrangements of the first and second type air filter cartridges.

14. The vehicle of claim 13, wherein the vehicle comprises a tractor.

15. The vehicle of claim 13, further comprising:
   a chassis; and
   a cab carried by the chassis and having a roof assembly, wherein the air treatment system is mounted to the roof assembly.

16. The vehicle of claim 15, wherein the air processing apparatus is configured to deliver filtered air to an interior of the cab.

17. The vehicle of claim 15, wherein the chassis is supported by a front wheel suspension and steering assembly and a rear axle assembly.

18. The vehicle of claim 13, wherein the air processing apparatus comprises an HVAC system.

19. A method of changing an operating mode of the air treatment system of claim 1, the method comprising:
   removing a first air filter cartridge from the air filter housing, wherein the first filter cartridge is of the first type; and
   installing a second air filter cartridge in the air filter housing, wherein the first filter cartridge is of the second type, wherein installing the second air filter cartridge comprises blocking one of the inner or outer conduits with the second air filter cartridge.

20. The method of claim 19, wherein installing a second air filter cartridge in the air filter housing comprises blocking the outer conduit with the second air filter cartridge.

* * * * *